United States Patent
Kuo

(10) Patent No.: US 8,944,642 B2
(45) Date of Patent: Feb. 3, 2015

(54) LIGHT ASSEMBLY

(75) Inventor: Hung-Pin Kuo, Taichung (TW)

(73) Assignee: B&M Optics Co., Ltd., Taichung (TW)

( * ) Notice: Subject to any disclaimer, the term of this patent is extended or adjusted under 35 U.S.C. 154(b) by 266 days.

(21) Appl. No.: 13/429,188

(22) Filed: Mar. 23, 2012

(65) Prior Publication Data

US 2012/0240976 A1    Sep. 27, 2012

(30) Foreign Application Priority Data

Mar. 25, 2011   (TW) .............................. 100110458 A

(51) Int. Cl.
| | |
|---|---|
| *F21V 7/00* | (2006.01) |
| *F21V 5/02* | (2006.01) |
| *F21V 5/04* | (2006.01) |
| *G02B 19/00* | (2006.01) |
| *F21Y 101/02* | (2006.01) |

(52) U.S. Cl.
CPC .................. *F21V 7/0091* (2013.01); *F21V 5/04* (2013.01); *G02B 19/0028* (2013.01); *G02B 19/0061* (2013.01); *F21Y 2101/02* (2013.01); *Y02E 10/52* (2013.01)
USPC ............................. 362/309; 362/308; 362/329

(58) Field of Classification Search
CPC .................. F21V 7/0091; F21V 5/043–5/048; F21V 5/008
USPC ............................. 362/329, 335, 334, 308, 309
See application file for complete search history.

(56) References Cited

U.S. PATENT DOCUMENTS

| | | | | |
|---|---|---|---|---|
| 2,015,235 | A * | 9/1935 | Rolph ........................... | 362/340 |
| 4,263,641 | A * | 4/1981 | Ferrero ......................... | 362/293 |
| 7,178,949 | B2 * | 2/2007 | Bernard et al. ............... | 362/300 |
| 7,591,570 | B2 * | 9/2009 | Holder et al. ................. | 362/341 |
| 7,748,872 | B2 * | 7/2010 | Holder et al. ................. | 362/308 |
| 7,837,349 | B2 * | 11/2010 | Chinniah et al. .............. | 362/244 |
| 8,068,288 | B1 | 11/2011 | Pitou | |
| 8,075,165 | B2 | 12/2011 | Jiang | |
| 8,226,283 | B2 * | 7/2012 | Gebauer et al. ............... | 362/522 |
| 8,579,485 | B2 * | 11/2013 | Hara .............................. | 362/522 |
| 2011/0110100 | A1 * | 5/2011 | Chen et al. ............... | 362/311.02 |

FOREIGN PATENT DOCUMENTS

TW           M305311          1/2007

* cited by examiner

*Primary Examiner* — Thomas M Sember
(74) *Attorney, Agent, or Firm* — Muncy, Geissler, Olds & Lowe, P.C.

(57) ABSTRACT

The present invention discloses a light assembly, which includes a transparent main body and a lens. The transparent main body includes an interior chamber gradually expanding from bottom to top, an inner wall encircling the interior chamber, and an outer wall encircling the inner wall. The outer wall is a total internal reflection surface. The inner wall includes a plurality of first facets facing a first direction and a plurality of second facets facing a second direction which is different from the first direction. The first facets and the second facets are provided to encircle the interior chamber respectively. Either side of each of the first facets is connected to one of the second facets, and each of the two adjacent first facet and second facet form an angle therebetween. The lens is fitted into the main body and faces the interior chamber of the main body.

5 Claims, 4 Drawing Sheets

LIGHT ASSEMBLY

BACKGROUND OF INVENTION

1. Field of Invention

The invention relates to a light assembly, and more especially to a light assembly with a cone-like lens.

2. Related Prior Art

A conventional LED light assembly includes a LED module, a secondary lens, a lamp mask and related components, such as shown in Taiwan patent number M305311. It is understood that the LED module is first assembled with the secondary lens, and fitted into the lamp mask, and then mounted with the related components. Light emitted from the LED module enters into the secondary lens and is then refracted by the secondary lens. After that, the light is reflected by inner wall of the lamp mask and therefore focused on an outside region to increase illumination of the desired region.

However, the conventional lamp mask is manufactured by metal stamping or die casting process, and it is necessary to form a reflective layer on the inner wall of the lamp mask to enable the light to focus on the intended region. This would cause a greater increase in manufacturing cost. Moreover, it is quite complicated to assemble the LED module, the secondary lens and the lamp mask together, which would further increase manufacturing cost.

SUMMARY OF INVENTION

The present invention discloses a light assembly, which includes a transparent main body. The transparent main body includes an interior chamber gradually expanding from bottom to top, an inner wall encircling the interior chamber, and an outer wall encircling the inner wall. The outer wall is a total internal reflection surface. Preferably, the outer wall of the main body is a combination of several circular plates. The inner wall includes a plurality of first facets facing a first direction and a plurality of second facets facing a second direction, wherein the first direction is different from the second direction. The plurality of first facets and the plurality of second facets are provided to encircle the interior chamber respectively. Either side of each of the first facets is connected to one of the second facets, and each two adjacent first and second facets form an angle therebetween.

The light assembly of the present invention further comprises a lens fitted into the main body. The lens has a first curve surface facing the interior chamber and a second curve surface opposite to the first curve surface. The first curve surface has a periphery that is totally in contact with the inner wall of the main body. Preferably, the first and the second curve surface are a spherical surface, respectively.

The light assembly of the present invention can be applied to a lamp, which is provided to direct light emitted from the LED module toward the bottom end of the main body and enable the light to be totally projected on the top end of the main body. Moreover, the light assembly of the present invention can be further applied to a photovoltaic panel for leading sunlight to travel toward the bottom end of the main body and thus focusing the sunlight on the photovoltaic panel.

Other features, objects, aspects and advantages will be identified and described in detail below.

DETAILED DESCRIPTION OF EMBODIMENTS

Figure 1:
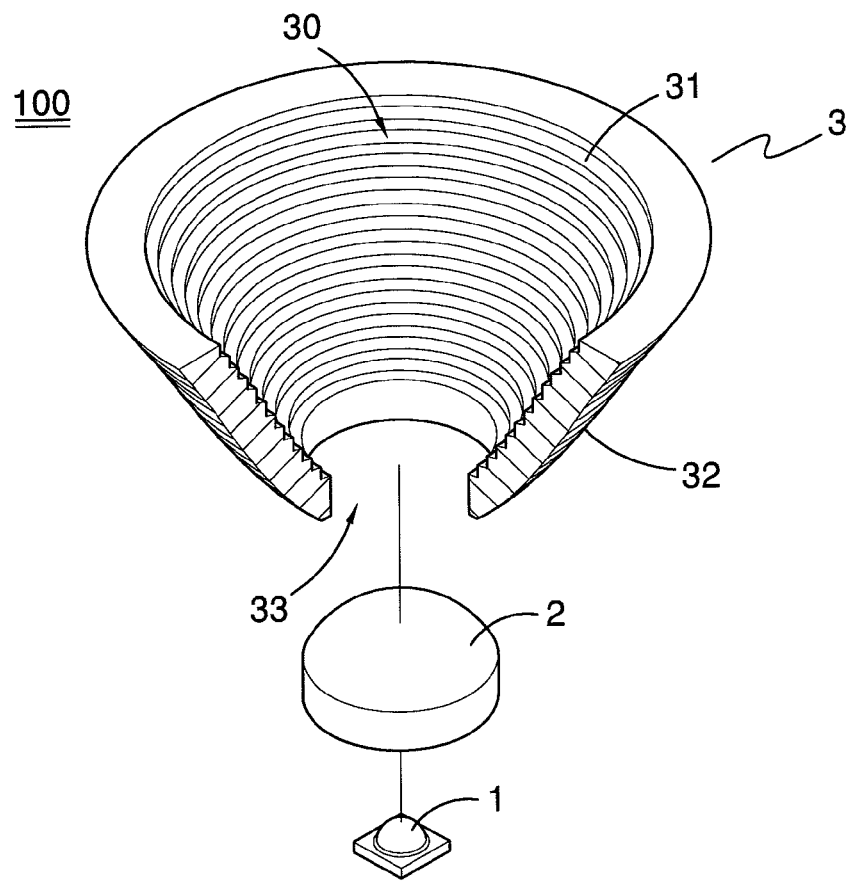
FIG. 1 is a simplified perspective view illustration a light assembly according to one embodiment of the present invention.
Figure 2:
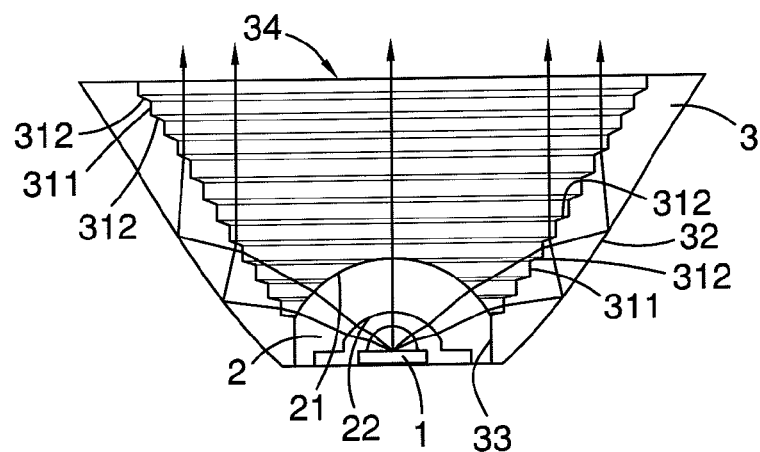
FIG. 2 is a cross sectional view illustrating the assembled elements of FIG. 1.

FIGS. 1 and 2 are simplified perspective views illustrating a light assembly 100 according to one embodiment of the present invention. The light assembly 100 comprises a LED module 1 and a cone-like lens shaped to fit into the LED module 1. The cone-like lens comprises a secondary lens 2 and a main body 3 shaped to fit into the secondary lens 2. Typically, the LED module 1 is a primary lighting package module. The secondary lens 2 is a lens designed to be in conjunction with the LED module 1. The main body 3 is a transparent material, particularly, the main body 3 is a special design which enables light emitted from the LED module 1 to project onto the intended region.

Specifically, the main body 3 comprises an interior chamber 30 gradually expanding from bottom to top. The interior chamber 30 is in communication with an opening 34 at a top end of the main body 3 and a hollow 33 at a bottom end of the main body 3. The main body 3 further comprises an inner wall 31 that encircles the interior chamber 30 and an outer wall 32 that encircles the inner wall 31. The outer wall 32 has a specific curvature, so as to form a total internal reflection surface. The secondary lens 2 is fitted into the hollow 33 at the bottom of the main body 3 and is thus configured together as an integrated assembly. Besides, the secondary lens 2 is mounted at a light emitting side of the LED module 1 so that the light emitted from the LED module 1 would pass through the secondary lens 2 and then travel into the interior chamber 30 of the main body 3. Part of the light entered into the interior chamber 30 directly projects toward the top end of the main body 3. The rest part of the light is refracted by the inner wall 31 of the main body 3 to enter through the main body 3, and then travels toward the outer wall 32 of the main body 3. The outer wall 32 of the main body 3 is designed as a total internal reflection surface, which allows the light entered through the main body 3 to be reflected by the total internal reflection, and thus travels toward the top end of the main body 3. FIG. 2 is a cross sectional view illustrating the assembled elements mentioned above. The main body 3 and the secondary lens 2 can be an assembling structure, which are configured together. This means that the assembling structure can directly accommodate with the LED module 1 therein. Therefore, compared with the traditional complicated assembly process, assembling process of the light assembly according to the present invention is quite easy and convenient. In one embodiment, the main body 3 can be made in a form of an integrated process, such as traditional plastic injection molding, thereby lowering material and manufacturing cost.

Figure 3:
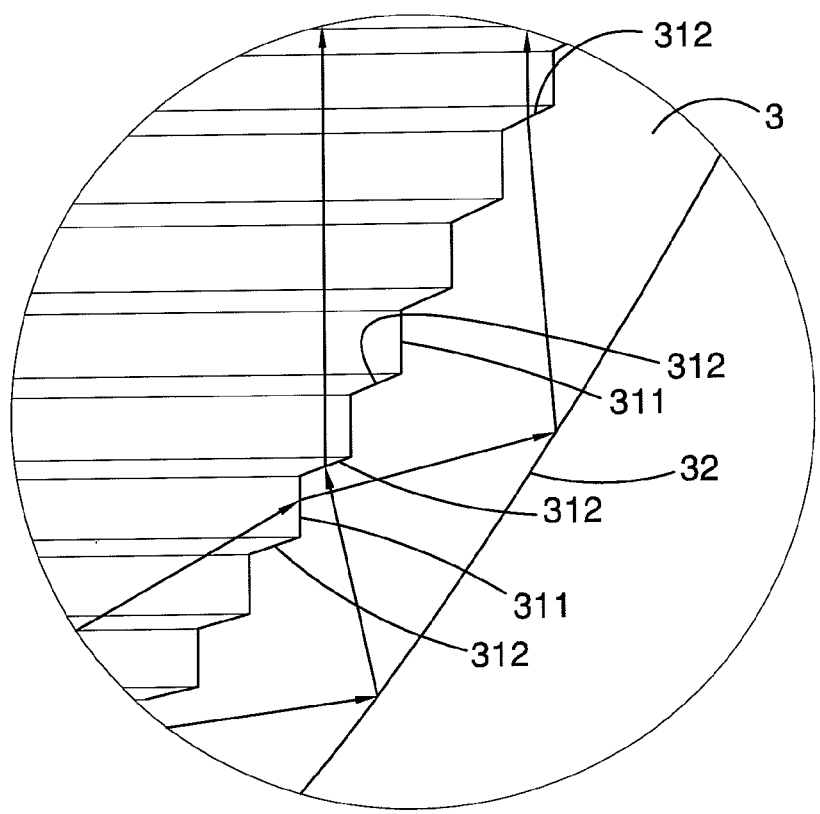
FIG. 3 is an enlarge perspective view of a part of the light assembly according to one embodiment of the present invention.

With reference to FIGS. 2 and 3, the inner wall 31 of the main body 3 can be in a form of a serrated structure according to the demands of light distribution and illumination. More specifically, the inner wall includes a plurality of first facets facing a first direction and a plurality of second facets facing a second direction, wherein the first direction is different from the second direction. The plurality of first facets 311 and the plurality of second facets 312 are provided to encircle the interior chamber 30 respectively. Either side of each of the first facets 311 is connected to one of the second facets 312, which means that the plurality of first facets 311 and the plurality of second facets 312 are in staggered arrangement. Each two adjacent first and second facets 311, 312 form an angle therebetween. Briefly speaking, the serrated structure includes plurality of serrations and each of the serrations is consisted of a first facet 311 and a second facet 312. Each of the plurality of the first facet 311 serves as a light incident surface to refract the light emitted from the LED module 1. The light refracted by the plurality of first facet 311 directs toward the outer wall 32 and then is reflected by the outer wall 32. The light reflected by the outer wall 32 travels toward the plurality of second facet 312. The plurality of second facets 312 are provided to refract the light reflected by the outer wall 32 toward the top end of the main body 3.

The secondary lens 2 is positioned inside the main body 3 and which includes a first curve surface 21 facing the interior chamber 30 and a second curve surface 22 facing the LED module 1. That shows that the second curve surface 22 is opposite to the first curve surface. The periphery of the first curve surface 21 is totally in contact with the inner wall 31 of the main body 3. The first curve surface 21 is provided to refract the part of light from the second curve surface 22 toward the plurality of the first facets 311.

Firstly, light emitted from the LED module 1 passes through the secondary lens and then directs toward the serrations of the serrated structure mentioned above. Specifically, the light is refracted by one of the first facets 311 and then directs toward the main body 3. After that, the light refracted by the preceding first facet 311 is reflected by the outer wall 32, and then the light is traveled toward the serrated structure again. The light is then refracted by one of the second facets 312 and is therefore directed toward the top end of the main body 3. Thus, the optical efficiency and optical utilization of the LED module 1 can be enhanced by the total internal reflection of the main body 3. In one embodiment, each of the serrations of the serrated structure encircles the central axis of the main body 3. As shown in FIG. 2, the serrated structure is but not limited to concentric arrangement. For example, in one embodiment, the main body 3 can be a rectangle body with four inner walls and each of the inner walls can be designed with different serrated structures thereon, so as to have the desired light distribution and enable the light to travel into the desired region.

In some practical application, due to the special designed structure of the main body 3 with a function of reflecting the light emitted distributed to the side from the LED module 1 toward the top end of the main body 3, the secondary lens 2 can be thus removed from the cone-like lens. Alternatively, the LED module 1 can includes an optical lens therein so that the secondary lens 2 can be also removed.

Figure 4:
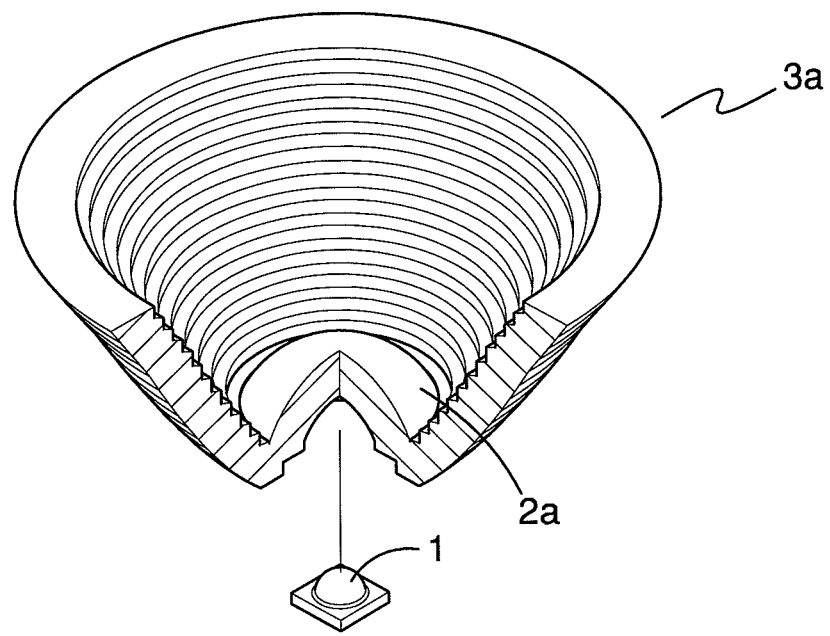
FIG. 4 is a simplified perspective views illustration a light assembly according to another embodiment of the present invention.
Figure 5:
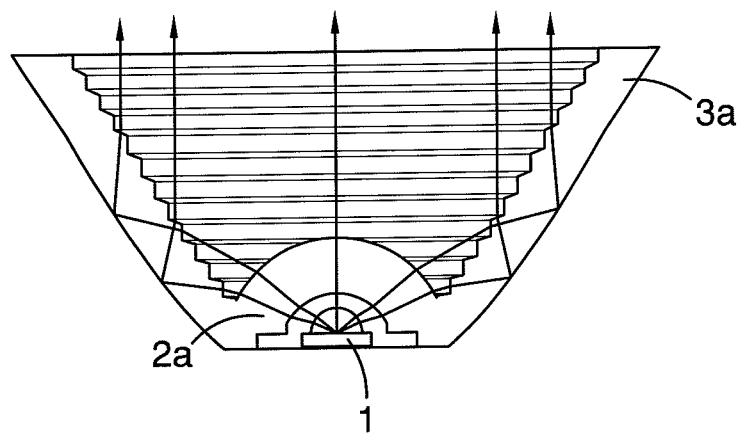
FIG. 5 a cross sectional view illustrating the assembled elements of FIG. 4.

With reference to FIGS. 4 and 5, a light assembly 200 is shown in accordance with another embodiment of the present invention. Similar to the light assembly 100 shown in FIGS. 1 and 2, the light assembly 200 includes similar elements to the above-mentioned embodiment. Differently, the main body 3a and the secondary lens 2a are made in a form of an integrated process, such that not only manufacturing process of the light assembly is more convenient, but also to the assembly process. Furthermore, the cost can be also greatly reduced. Besides, the main body 3a and the secondary lens 2a is a one-piece element made in a form of an integrated process, thereby achieving waterproofing effect.

Figure 6:
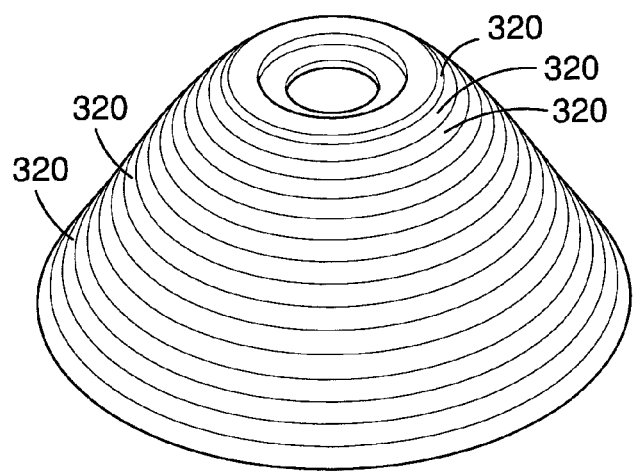
FIG. 6 is a simplified perspective views illustration the main body of the light assembly according to one embodiment of the present invention.
Figure 7:
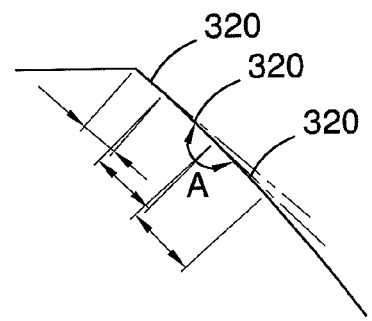
FIG. 7 is an enlarge perspective view of a part of the main body according to one embodiment of the present invention.

As shown in FIGS. 6 and 7, based on manufacturing convenience, the outer wall of the main body mentioned above is substantially formed by a combination of several circular plates 320. Specifically, each two adjacent circular plates 320 form an angle A approximately between 177° and 180°, as shown in FIG. 7, thereby forming the aforementioned total internal reflection with specific curvature. Moreover, the angle A between these circular plates 320 becomes smaller to the bottom end of the main body 3, 3a. For example, the four adjacent circular plates 320 near the bottom end of the main body have an angle of about 177°; which are farther away the bottom end of the main body may have an angle of about 178°; and then which are quite farther away the bottom end of the main body may have an angle of about 179°; and which are closest to the top end of the main body may have an angle of near 180°.

From the above-mentioned illustration, it is understood the light assembly or the cone-like lens of the present invention is not only an easy-making device, but also a convenient-assembling device. Particularly, the inner wall and outer wall of the main body is designed specially, thereby making light patterns to be changed by the secondary lens as well as achieving the desired distribution effects by the transparent main body. Compared to the prior art, the main body of the present invention is a transparent material and in a special optical design shape, which enables the outer wall of the main body to form a total internal reflection. Thus, it is not necessary to form a reflective layer on the inner wall of the main body after the main body is manufactured by injection molding.

Figure 8:
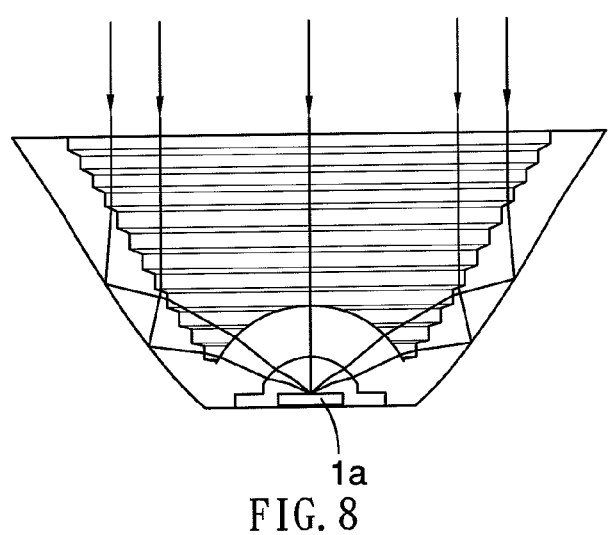
FIG. 8 is a simplified perspective views illustration a light assembly with a photovoltaic panel according to still another embodiment of the present invention.

FIG. 8 is a simplified perspective view illustration a cone-like lens applied to a photovoltaic panel according to still another embodiment of the present invention. In this embodiment, the LED module 1 mentioned above is replaced by a photovoltaic panel 1a, which means that the cone-like lens is positioned above one of photovoltaic cells of the photovoltaic panel. Sunlight enters the main body from the top end of the main body, and travels along the same light path which direction is opposite to the aforementioned embodiment, and finally focuses onto the photovoltaic panel 1a. That is, the second facet is provided to refract the incident light toward the outer wall, and then the outer wall is used to reflect the light refracted by the second facet toward the first facet. The first facet is provided to refract the light reflected by the outer wall toward the bottom end of the main body. The secondary lens is used to focus the light refracted by the first facet on the photovoltaic panel. Therefore, the cone-like lens of the present invention can be considered as a concentrated photovoltaic.

It will be appreciated that although a particular embodiment of the invention has been shown and described, modifications may be made. It is intended in the claims to cover such modifications which come within the spirit and scope of the invention.

The invention claimed is:
1. A light assembly comprising:
a transparent main body including an interior chamber gradually expanding from bottom to top, an inner wall encircling the interior chamber, and an outer wall encircling the inner wall, wherein the outer wall is a total internal reflection surface and includes a plurality of circular plates; each two adjacent circular plates form an angle between 177° and 180° and the angle decreases from the top of the transparent main body to the bottom thereof; the inner wall includes a plurality of first facets facing a first direction and a plurality of second facets facing a second direction that is different from the first direction; the plurality of first facets and the plurality of second facets are provided to encircle the interior chamber respectively; either side of each of the first facets is connected to one of the second facets; each two adjacent first and second facets form an angle therebetween; the plurality of first facets are used to refract incident light toward the outer wall; the outer wall is used to reflect the light refracted by the plurality of first facets toward the plurality of second facets; and the plurality of the second facets are used to refract the light reflected by the outer wall toward a top end of the main body.

2. The light assembly of claim 1, further comprising:
a lens fitted into the main body and including a first curve surface facing the interior chamber and a second curve surface opposite to the first curve surface; wherein the first curve surface has a periphery that is totally in contact with the inner wall of the main body; and the first curve surface is provided to refract part of the light from the second curve surface toward the plurality of first facets.

3. The light assembly of claim 2, wherein the first curve surface is a spherical surface.

4. The light assembly of claim 2, wherein the second curve surface is a spherical surface.

5. The light assembly of claim 1, wherein the outer wall of the main body is a combination of several circular plates.

* * * * *